United States Patent [19]

Kielmeyer et al.

[11] Patent Number: 5,639,291

[45] Date of Patent: Jun. 17, 1997

[54] METHOD OF AND APPARATUS FOR FORMING COMPOSITE AND OTHER FIBERS

[75] Inventors: William Henry Kielmeyer, Englewood; Michael Dean Peterson, Parker; Dennis Robert Larratt, Littleton, all of Colo.

[73] Assignee: Schuller International, Inc., Denver, Colo.

[21] Appl. No.: 414,605

[22] Filed: Mar. 31, 1995

[51] Int. Cl.$^6$ ................................................ C03B 37/022
[52] U.S. Cl. .................... 65/438; 65/462; 65/465; 65/468; 65/475; 65/502; 65/504; 65/507; 65/524; 65/528; 65/535; 264/172.14; 264/172.17; 264/DIG. 26; 264/DIG. 75; 425/131.5; 425/DIG. 217
[58] Field of Search ...................... 65/438, 442, 462, 65/465, 468, 475, 502, 504, 505, 524, 528, 535; 264/172.11, 172.14, 172.17, DIG. 26, DIG. 75; 425/DIG. 217, 131.5

[56] References Cited

U.S. PATENT DOCUMENTS

| | | |
|---|---|---|
| 2,398,729 | 4/1946 | Taylor et al. . |
| 3,021,564 | 2/1962 | Morgan et al. ............... 65/468 X |
| 3,077,093 | 2/1963 | Helbing et al. ............... 65/462 |
| 3,236,616 | 2/1966 | Stalego et al. . |
| 3,259,479 | 7/1966 | Tiede . |
| 3,381,074 | 4/1968 | Bryan et al. ............... 264/172.17 X |
| 3,601,846 | 8/1971 | Hudnall ............... 264/172.14 X |
| 3,653,861 | 4/1972 | Stalego et al. . |
| 4,050,916 | 9/1977 | Russell . |
| 4,346,052 | 8/1982 | Knox . |
| 5,328,493 | 7/1994 | Roncato et al. ............... 264/172.14 X |

*Primary Examiner*—David A. Simmons
*Assistant Examiner*—M. Curtis Mayes
*Attorney, Agent, or Firm*—Cornelius P. Quinn

[57] ABSTRACT

In a method of and an apparatus for forming composite and other fibers, individual filaments from two or more sets of continuous primary filaments of two or more heat-softenable fiberizable materials are brought together lengthwise to form pairs of continuous primary filaments. The groupings of continuous primary filaments are fed into a high energy attenuation blast where the filaments are heated, attenuated and formed into composite or other staple fibers of the heat-softenable fiberizable materials. Preferably, the individual continuous primary filaments of the groupings of continuous primary filaments are fused, adhesively bonded or otherwise joined together, prior to being introduced into the high energy attenuation blast, to prevent the individual primary filaments of the groupings of continuous primary filaments from separating in the high energy attenuation blast.

25 Claims, 1 Drawing Sheet

METHOD OF AND APPARATUS FOR FORMING COMPOSITE AND OTHER FIBERS

BACKGROUND OF THE INVENTION

The present invention is directed to a method of and an apparatus for forming composite fibers, conjugated fibers and other fibers from fiberizable materials, such as glass, and other heat-softenable, fiberizable materials, and in particular, a flame attenuation fiberization process for forming such fibers.

A composite fiber is a fiber composed of two or more heat softenable materials wherein the heat-softenable fiberizable materials retain or essentially retain their individual compositions. A conjugated fiber is a composite fiber composed of two or more heat-softenable fiberizable materials that are joined together along their lengths but, essentially, retain their individual compositions.

Glass and polymeric hi-material fibers (co-fibers) have been known and used for decades. Optical glass fibers are one example of a co-fiber consisting of an inner core or fiber of a glass having a high refractive index surrounded by a sheath or coating of glass with a low refractive index. Another example of co-fibers, are polymeric co-fibers consisting of an inner core or fiber of a polymer having a high temperature softening point surrounded by a sheath or coating of a polymer having a relatively low temperature softening point. When heat is applied to these polymeric co-fibers, the outer sheaths or coatings of these co-fibers soften and the co-fibers bond to other fibers with which these co-fibers are in contact.

Another example of co-fibers are glass co-fibers consisting of two glasses having different coefficients of thermal expansion which glasses are fused together along their lengths. Since the glasses have different coefficients of thermal expansion, these co-fibers twist and bend when cooled during the fiberization process. U.S. Pat. No. 3,259,479; issued Jul. 5, 1966; and entitled "Method of Making Curly Composite Fibers"; discloses a method of making curly fibers wherein two glasses are drawn from orifices in a feeder by a rotating collet or feed rolls to form the glasses into bi-glass fibers. U.S. Pat. No. 4,050,916; issued Sep. 27, 1977; and entitled "Method and Apparatus for Forming Kinky Fibers from Glass" also discloses a method of making bi-glass fibers (illustrated in FIGS. 19 to 23) which is similar to the method disclosed in U.S. Pat. No. 3,259,479. However, in both of these methods, the bi-glass fibers are formed at the orifice tips or openings of the feeders. Accordingly, if the coefficients of thermal expansion of the glasses used to form the bi-glass primary filaments or fibers are sufficiently different, the primary filaments can twist and curl as they cool, prior to entering the grooves of the guide or gathering wheels. Thus, the primary filaments can become difficult to align in the grooves of the guide or gathering wheels and it is difficult to prevent interruptions in the filament or fiber forming process.

SUMMARY OF THE INVENTION

The method and apparatus of the present invention solve many of the difficulties encountered in the composite and curly fiber, flame attenuation processes of the prior art. In the method and apparatus of the present invention, groupings of two or more continuous primary filaments are formed with at least two of the primary filaments in some of the groupings being made of different heat-softenable fiberizable materials. A pair of feed rollers feed the groupings of continuous primary filaments into a high energy attenuation blast where the primary filaments are heated and the two or more heat-softenable fiberizable materials of the primary filaments mingle or commingle to form filaments which are attenuated into composite or other staple fibers. When the heat-softenable fiberizable materials of the primary filaments are mingled to form the fiber, there is no fundamental loss of the identities or compositions of the different heat-softenable fiberizable materials in the fiber. A conjugated fiber is an example of this type of fiber. When the heat-softenable fiberizable materials of the primary filaments are commingled to form the fiber, the different heat-softenable fiberizable materials of the primary filaments become blended together, are homogenous or essentially homogenous (with a loss of their individual identities and compositions), and form a fiber of a different composition.

In one embodiment of the present invention, the primary filaments are drawn from orifices in feeders which contain a molten supply of the heat-softenable fiberizable materials. However, while it is preferred to form the staple fibers in such a continuous process, it is contemplated that the primary filaments could also be drawn from two or more supply rolls of previously formed primary filaments.

In one embodiment of the present invention, the primary filaments are adhesively bonded, fused or otherwise joined together lengthwise, prior to being introduced into the high energy attenuation blast, to prevent the primary filaments from separating in the high energy attenuation blast. Preferably, the primary filaments are joined together immediately prior to being introduced into the high energy blast where the primary filaments are heated, attenuated and formed into composite or other staple fibers. Once the staple fibers are formed, the staple fibers are collected, typically in a conventional manner, on a collection chain and conveyed away for further processing or packaging.

DESCRIPTION OF THE PREFERRED EMBODIMENTS

Although the present invention, as herein described, is principally related to glass fiber forming operations, it is to be understood that composite and other staple fibers of heat-softenable, fiberizable materials other than glass can be formed in accordance with the method and by means of the apparatus of the present invention. Examples of other heat-softenable, fiberizable materials which can be formed into composite and other fibers in accordance with the present invention include, but are not limited to, sol-gels, polymeric materials, and polysaccharides as used in the food, pharmaceutical and paper industries.

Preferably, for certain products, the two or more heat-softenable, fiberizable materials are compatible with each other. For example, when forming conjugated, curly fibers, a factor determining the compatibility of the two or more heat-softenable, fiberizable materials is the tendency of the heat-softenable, fiberizable materials 24 and 26 or 24, 25 and 26 not to intermix or diffuse into each other before attenuation and solidification of the conjugated fiber occurs. However, by joining the primary filaments 42 and 44 or 42, 43 and 44 together immediately prior to the introduction of the primary filaments into a high energy attenuation blast, process problems caused by the intermixing or diffusing of the two or more heat-softenable, fiberizable materials 24 and 26 or 24, 25 and 26 is minimized. Thus, the range of heat-softenable, fiberizable materials, which can be used together without degrading the desired properties of the end product, is greatly increased.

While only three different heat-softenable fiberizable materials 24, 25 and 26 are shown forming separate primary filaments 42, 43 and 44, respectfully, any number of primary filaments, with at least two of the filaments made of different heat-softenable fiberizable materials, can be used in the present invention. Different heat-softenable fiberizable materials include, but are not limited to, glasses and other heat-softenable fiberizable materials of the same type, but having different coefficients of thermal expansion, softening point temperatures, hardness, viscosities, or other properties.

Figure 1:
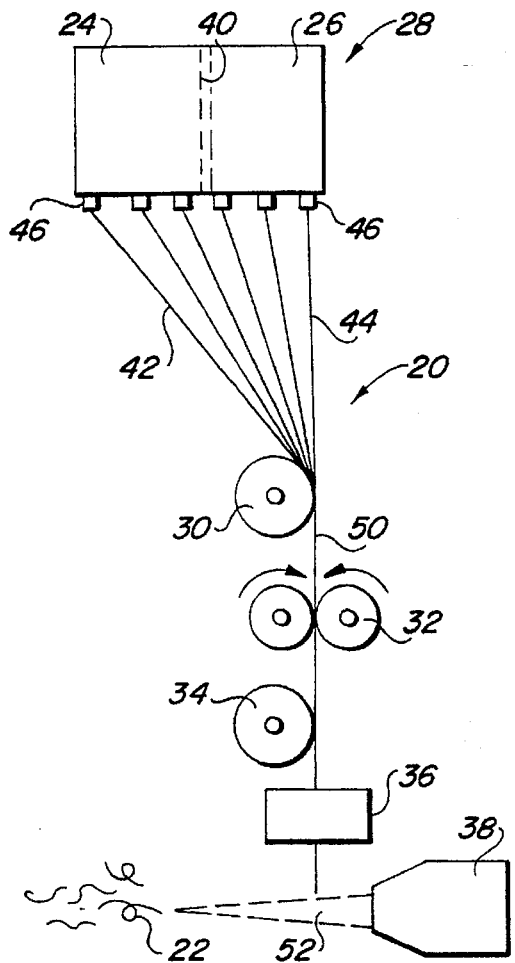
FIG. 1 is a schematic elevation of an apparatus of the present invention for forming the staple fibers of two heat-softenable fiberizable materials.
Figure 2:
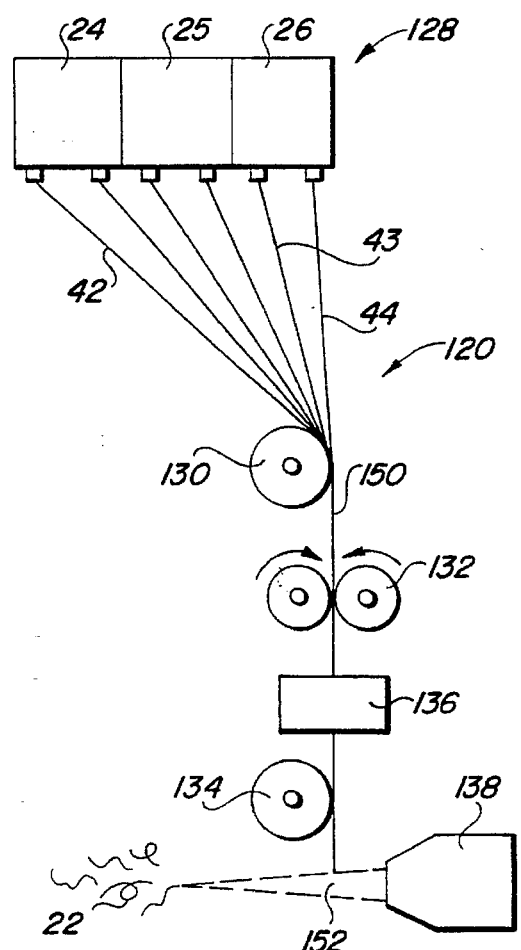
FIG. 2 is a schematic elevation of an apparatus of the present invention for forming staple fibers of two or more heat-softenable fiberizable materials.

When producing composite, conjugated or other staple glass fibers by the method and/or with the apparatus of the present invention, the high energy attenuation blast is preferably a high energy combustion blast produced by a conventional flame attenuation burner as schematically illustrated in FIGS. 1 and 2. When producing composite, conjugated or other staple fibers from other heat-softenable fiberizable materials having lower temperature melting points than glass, the high energy attenuation blast can take other forms, such as a high energy hot air blast that can heat the primary filaments so that the heat-softenable fiberizable materials of the primary filaments mingle or commingle to form attenuated staple fibers.

FIG. 1 illustrates an apparatus 20 for forming composite or other staple fibers 22 from two different heat-softenable, fiberizable materials 24 and 26. FIG. 2 illustrates an apparatus 120 for forming composite or other staple fibers 22 from two or more different heat-softenable fiberizable materials 24, 25 and 26.

The apparatus 20 comprises: a feeder or pot 28 comprising two separate compartments; an upper filament guide 30; feed rollers 32; a lower filament guide 34; a filament joining means 36; and an attenuation burner 38. The staple or finite length fibers 22 formed by the method and with the apparatus of the present invention can be collected to form a mat or blanket product or for further processing or packaging by conventional methods (not shown). Typically, the staple fibers 22 are accumulated or deposited on a collection chain to form a mat or blanket. Where curly fibers are formed by the present invention, such composite staple fibers impart bulkiness to the mat or blanket product.

As shown in FIG. 1, the feeder or pot 28 has a partition 40 which extends generally along the longitudinal centerline or diameter of the feeder or pot 28 and separates the two different heat-softenable, fiberizable materials 24 and 26, e.g. two glasses having different coefficients of thermal expansion. Typically, the feeder or pot 28 is heated by gas burners or electrical terminals are provided at opposite ends of or on opposite sides of the feeder or pot 28 in a conventional manner and electrical current is passed through the liquified, heat-softenable, fiberizable materials 24 and 26 to heat the molten or liquified materials in the feeder or pot 28.

Typically, the feeder or pot 28 is replenished with the two separate heat-softenable, fiberizable materials 24 and 26 by the introduction of marbles or other solid forms of the two heat-softenable, fiberizable materials into their respective separate compartments within the feeder or pot and the heat-softenable, fiberizable materials are maintained at desired levels within the feeder or pot 28 by a conventional control system. Alternatively, molten or liquified forms of the two heat-softenable, fiberizable materials 24 and 26 can be introduced into the separate compartments of the feeder or pot from separate melting or liquefying sources and maintained in the molten or liquified form by the gas burner or electrically heated feeder or pot.

As an alternative to a partitioned feeder or pot 28, two separate gas burner or electrically heated feeders or pots (not shown) can be used for the formation of the primary filaments. As with the partitioned feeder or pot 28, the two feeders or pots can be used to form primary filaments from molten heat-softenable fiberizable materials such as glasses having different melting points, viscosities at the processing temperatures, degrees of hardness or other physical characteristics.

The primary filaments 42 and 44 are drawn and attenuated from orifice tips or openings 46 of the feeder or pot 28 by the feed rollers 32 which are conventional feed rollers driven by conventional motor drive means (not shown). Since the primary filaments are brought together in pairs and further attenuated by the attenuation burner 38, the combined diameter of the primary filaments 42 and 44 is greater than the desired diameter of the composite or other fibers 22 formed by the method and apparatus of the present invention.

Figure 3:
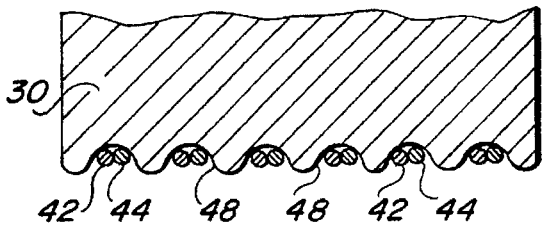
FIG. 3 is a partial horizontal section, through the upper or lower filament guide of the apparatus of the present invention, showing primary filaments of two different heat-softenable fiberizable materials being brought together in pairs.

The feed rollers 32 draw the primary filaments 42 and 44 over the upper filament guide 30 and has a series of grooves 48 therein for receiving and guiding the primary filaments. As shown in FIG. 3, in one embodiment of the present invention, each groove 48 of the upper guide 30 receives and guides one primary filament of each set of primary filaments 42 and 44 to form pairs 50 of primary filaments. After passing through the feed rollers 32, the pairs 50 of primary filaments are introduced into a high energy combustion blast 52 of the attenuation burner 38 where the pairs of primary filaments are rapidly heated, the heat-softenable fiberizable materials 24 and 26 mingle or commingle, and the resulting fibers are attenuated into discrete length or staple composite or other fibers 22. Preferably, a lower primary filament guide 34, identical to the upper primary filament guide 30, is located between the feed rollers 32 and the high energy combustion blast 52 to guide and facilitate the introduction of the pairs 50 of primary filaments into the high energy combustion blast 52. Where the lower primary filament guide 34 is used, if desired, the primary filaments 42 and 44 can be kept separated from each other in the upper filament guide (e.g. one primary filament per groove 48) and the pairing of the primary filaments can be performed by the lower filament guide 34.

In certain applications, the residual heat from the high energy combustion blast 52 will be sufficient to physically join together the primary filaments 42 and 44 of the pairs of primary filaments (e.g. by bonding or fusing the primary filaments together) before the pairs of primary filaments are introduced into the high energy combustion blast so that the primary filaments of the pairs of primary filaments will not separate from each other in the high energy combustion blast. However, in one preferred embodiment of the present invention, the filament joining means 36 is located at or intermediate the upper primary filament guide 30 and the high energy combustion blast 52 to join the pairs 50 of primary filaments together lengthwise. Preferably, the filament joining means 36 is located, as shown in FIG. 1, immediately above the high energy combustion blast 52 and at or below the lower filament guide 34. By placing the filament joining means 36 at this preferred location, the primary filaments of the pairs 50 of primary filaments are physically joined together for the briefest period of time prior to being rapidly heated, attenuated and formed into the staple composite or other fibers 22. Thus, problems associated with incompatibility of the heat-softenable fiberizable materials used to form the primary filaments 42 and 44 is minimized. While this is the preferred location for the filament joining means 36, in some cases, it is anticipated that the formation of a particular composite or other fiber could be enhanced by physically joining the primary filaments at the upper filament guide 30 or somewhere intermediate the upper filament guide and the location immediately above the high energy combustion blast 52.

The filament joining means 36 is a means for fusing, bonding or otherwise physically joining the primary filaments 42 and 44 of the pairs 50 of primary filaments together lengthwise so that the primary filaments of the pairs of primary filaments do not separate in the high energy combustion blast 52. One example of the filament joining means 36 is an auxiliary heater, such as a radiant heater or other conventional heater means or combustion gases diverted from the attenuating burner 38, for rapidly heating the primary filaments up to a temperature where at least the surfaces of the primary filaments become sufficiently tacky to bond or fuse the filaments together. Another example of the filament joining means 36 is a conventional adhesive applicator having application rolls or other means which apply an adhesive or cement to the primary filaments as the primary filaments pass between the application rolls to adhesively bond the primary filaments together.

The apparatus 120 of FIG. 2 comprises a feeder or pot, partitioned into separate compartments, or three separate feeders or pots 128; an upper filament guide 130; feed rollers 132; a lower filament guide 134; a filament joining means 136; and an attenuation burner 138. As with the embodiment of FIG. 1, the staple or finite length fibers 22 can be collected by conventional collection means (not shown). Other than utilizing a feeder or pot having three separate compartments or utilizing three separate feeders or pots 128 and locating the filament joining means 136 intermediate the feed rollers 132 and the lower filament guide 134, the apparatus 120 of FIG. 2 is the same as the apparatus 20 of FIG. 1.

In the apparatus 120 of FIG. 2, three heat-softenable fiberizable materials 24, 25 and 26, such as glass, are formed into primary filaments 42, 43 and 44, respectively, by being drawn from orifice tips or openings 146 of the feeders or pots 128 by the feed rollers 132. Since the filament joining means 136 is located above the lower filament guide 134, the primary filaments 42, 43 and 44 are brought together in the grooves of the upper filament guide 130. However, by locating the filament joining means 136 below the filament guide 134, the primary filaments 42, 43 and 44 can be brought together at the upper filament guide 130 or the lower filament guide 134. As with the embodiment of FIG. 1, the groupings 150 of primary filaments are fed into the high energy combustion blast 152 where the heat-softenable fiberizable materials 24, 25 and 26 are rapidly heated and mingle or commingle to form attenuated staple fibers 22.

Figure 4:
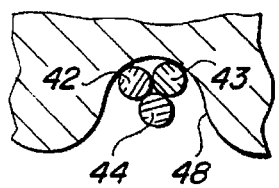
FIG. 4 is a fragmentary view of one groove in the filament guide showing three primary filaments of three different heat-softenable fiberizable materials being brought together in a grouping.
Figure 5:
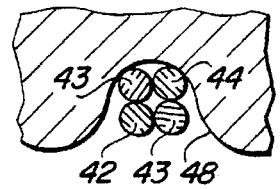
FIG. 5 is a fragmentary view of one groove in the filament guide showing four primary filaments of three different heat-softenable fiberizable materials being brought together in a grouping.
Figure 6:
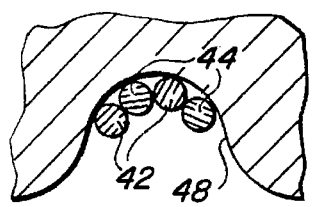
FIG. 6 is a fragmentary view of one groove in the filament guide showing four primary filaments of two different heat-softenable fiberizable materials being brought together in a grouping.
Figure 7:
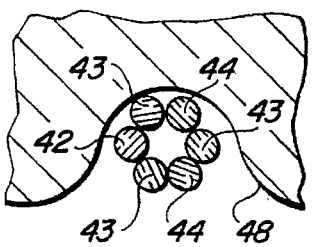
FIG. 7 is a fragmentary view of one groove in the filament guide showing six primary filaments of three different heat-softenable fiberizable materials being brought together in a grouping.

FIGS. 4–7 show examples of different groupings 150 of the primary filaments 42, 43 and 44 in a groove of either the upper or lower filament guide so that the primary filaments can be attenuated and the heat-softenable fiberizable materials 24, 25 and 26 mingled or commingled in a high energy attenuating blast to form a variety of different staple fibers 22. In FIG. 4, one primary filament of each of the primary filaments 42, 43 and 44 is being brought together with other primary filaments in the groove. In FIG. 5, four primary filaments are being brought together in the groove. One primary filament 42, one primary filament 44 and two primary filaments 43. In FIG. 6, two primary filaments 42 are being brought together with two primary filaments 44. In FIG. 7, one primary filament 42, three primary filaments 43 and two primary filaments 44 are being brought together in the groove.

The groupings of primary filaments are not limited to those shown in the drawings. The arrangement of the primary filaments in the grooves 48 can be random or orderly. Special guides can be used to maintain the individual primary filaments of a grouping in a particular spatial arrangement. The diameters as well as the compositions and/or properties of the individual primary filaments being brought together in the grooves 48 can differ. The number of different types of primary filaments grouped together can be greater than the three primary filaments 42, 43 and 44 shown in the drawings and discussed above.

Figure 8:
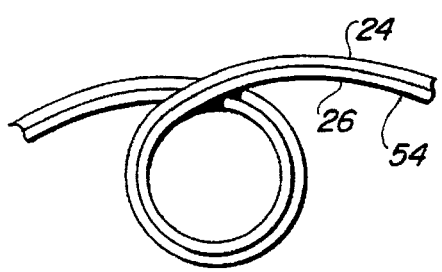
FIG. 8 is an enlarged schematic of a conjugated composite fiber formed in accordance with the method and by the apparatus of the present invention.

As discussed above the method and apparatus of the present invention can be used to form various types of finite length or staple composite, conjugated or other fibers 22 of heat-softenable fiberizable materials, such as the curly conjugated fiber 54 of FIG. 8. In addition to forming fibers from glasses or other heat-softenable materials which have different physical characteristics, such as coefficients of thermal expansion, softening points, hardness, viscosities, etc., it is contemplated that the method and apparatus of the present invention might also be used to form composite fibers of heat-softenable materials that may react together at elevated temperatures to form unique staple fibers.

As discussed above, while conventional flame attenuation burners have been disclosed as a preferred means of providing a high energy attenuation blast, especially when forming staple fibers of glass or other high temperature melting point materials with the method and apparatus of the present invention, the high energy attenuation blast can be a high energy hot air blast or other high energy means having the heat and energy required to rapidly heat, attenuate and form staple fibers from the heat-softenable fiberizable materials being fiberized.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method of making staple fibers in a flame attenuation process, comprising:

drawing a first set of continuous primary filaments of a first heat-softenable fiberizable material having a first coefficient of thermal expansion;

drawing a second set of continuous primary filaments of a second heat-softenable fiberizable material having a second coefficient of thermal expansion different from the first coefficient of thermal expansion;

bringing individual continuous primary filaments of said first set of continuous primary filaments together lengthwise with individual continuous primary filaments of said second set of continuous primary filaments and forming groupings of continuous primary filaments from the individual continuous primary filaments;

introducing the groupings of the individual continuous primary filaments into a high energy attenuation blast; and heating, attenuating and forming the groupings of individual continuous primary filaments by means of said high energy attenuation blast into staple fibers having the heat-softenable fiberizable materials mingled in the staple fibers.

2. The method of making staple fibers according to claim 1, wherein: said first set of continuous primary filaments are drawn from a first feeder means; and said second set of continuous primary filaments are drawn from a second feeder means.

3. The method of making staple fibers according to claim 1, wherein: said staple fibers are conjugated curly fibers.

4. The method of making staple fibers according to claim 1, wherein: said heat-softenable fiberizable materials are glass.

5. The method of making staple fibers according to claim 4, wherein: said staple fibers are conjugated fibers.

6. The method of making staple fibers according to claim 1, including: drawing a third set of continuous primary filaments of a heat-softenable fiberizable material; and bringing individual continuous primary filaments of said first, second and third sets of continuous primary filaments together lengthwise to form the groupings of continuous primary filaments.

7. A method of making staple fibers in a flame attenuation process, comprising:

drawing a first set of continuous primary filaments of a first heat-softenable fiberizable material;

drawing a second set of continuous primary filaments of a second heat-softenable fiberizable material;

bringing individual continuous primary filaments of said first set of continuous primary filaments together lengthwise with individual continuous primary filaments of said second set of continuous primary filaments and forming groupings of continuous primary filaments from the individual primary filaments;

introducing the groupings of continuous primary filaments into a high energy attenuation blast; and heating, attenuating and forming the groupings of continuous primary filaments by means of said high energy attenuation blast into staple fibers having the heat-softenable fiberizable materials commingled in the staple fibers.

8. A method of making staple fibers in a flame attenuation process, comprising:

drawing a first set of continuous primary filaments of a first heat-softenable fiberizable material;

drawing a second set of continuous primary filaments of a second heat-softenable fiberizable material;

bringing individual continuous primary filaments of said first set of continuous primary filaments together lengthwise with individual continuous primary filaments of said second set of continuous primary filaments and forming groupings of continuous primary filaments from the individual primary filaments;

joining together the individual continuous primary filaments of the groupings of continuous primary filaments with an organic adhesive, prior to introducing the groupings of continuous primary filaments into a high energy attenuation blast, to prevent the individual continuous primary filaments from separating from each other in the high energy attenuation blast;

introducing the groupings of continuous primary filaments into said high energy attenuation blast; and heating, attenuating and forming the groupings of continuous primary filaments by means of said high energy attenuation blast into staple fibers of the heat-softenable fiberizable materials.

9. A method of making staple fibers in a flame attenuation process, comprising:

drawing a first set of continuous primary filaments of a first heat-softenable fiberizable material;

drawing a second set of continuous primary filaments of a second heat-softenable fiberizable material;

bringing individual continuous primary filaments of said first set of continuous primary filaments together lengthwise with individual continuous primary filaments of said second set of continuous primary filaments and forming groupings of continuous primary filaments from the individual primary filaments;

joining together the individual continuous primary filaments of the groupings of continuous primary filaments with a water based inorganic cement, prior to introducing the groupings of continuous primary filaments into a high energy attenuation blast, to prevent the individual continuous primary filaments from separating from each other in the high energy attenuation blast;

introducing the groupings of continuous primary filaments into said high energy attenuation blast; and heating, attenuating and forming the groupings of continuous primary filaments by means of said high energy attenuation blast into staple fibers of the heat-softenable fiberizable materials.

10. A method of making staple fibers in a flame attenuation process, comprising:

drawing a first set of continuous primary filaments of a first heat-softenable fiberizable material;

drawing a second set of continuous primary filaments of a second heat-softenable fiberizable material;

drawing a third set of continuous primary filaments of a heat-softenable fiberizable material;

bringing individual continuous primary filaments of said first set of continuous primary filaments together lengthwise with individual continuous primary filaments of said second set of continuous primary filaments and individual continuous primary filaments of said third set of continuous primary filaments; and forming groupings of continuous primary filaments from the individual primary filaments;

introducing the groupings of continuous primary filaments into a high energy attenuation blast; and heating, attenuating and forming the groupings of continuous primary filaments by means of said high energy attenuation blast into staple fibers having the heat-softenable fiberizable materials commingled together within the staple fibers.

11. An apparatus for forming staple fibers, comprising:

a filament feeder means having means for forming a first set of continuous primary filaments from a first heat-softenable, fiberizable material and a second set of continuous primary filaments from a second heat-softenable, fiberizable material;

feed rollers for drawing the continuous primary filaments from said filament feeder means;

a first filament guide intermediate said filament feeder means and an attenuation means; said first filament guide having means for bringing individual continuous primary filaments of said first set of continuous primary filaments together lengthwise with individual continuous primary filaments of said second set of continuous primary filaments to form groupings of continuous primary filaments from the individual continuous primary filaments;

an attenuation means for heating, attenuating and forming the groupings of continuous primary filaments into staple fibers comprising the heat-softenable fiberizable materials; said attenuation means having a high energy attenuation blast into which the groupings of continuous primary filaments are fed by said feed rollers; and joining means intermediate said first filament guide and said attenuation means for joining together the individual continuous primary filaments of the groupings of continuous primary filaments to prevent the individual continuous primary filaments of the groupings of continuous primary filaments from separating from each other in the high energy attenuation blast.

12. The apparatus of claim 11, wherein: said first filament guide is located intermediate said filament feeder means and said feed rollers.

13. The apparatus of claim 12, including: a second filament guide intermediate said feed rollers and said attenuation means for guiding the groupings of continuous primary filaments into the high energy attenuation blast.

14. The apparatus of claim 11, wherein: said first filament guide is located intermediate said feed rollers and said attenuation means.

15. The apparatus of claim 14, wherein: said joining means comprises a heater which fuses the individual continuous primary filaments of the groupings of continuous primary filaments together.

16. The apparatus of claim 15, wherein: said joining means is located intermediate said feed rollers and said attenuation means.

17. The apparatus of claim 11, wherein: said joining means is an adhesive applicator.

18. The apparatus of claim 8, wherein: said joining means is located intermediate said feed rollers and said attenuation means.

19. The apparatus of claim 11, wherein: said filament feeder means has orifices therein from which said first set of continuous primary filaments and said second set of continuous primary filaments are drawn.

20. The apparatus according to claim 11, wherein: said attenuation means is a flame attenuation burner.

21. The apparatus according to claim 11, wherein: said filament feeder includes means for forming a third set of continuous primary filaments from a heat-softenable material; and said first filament guide has means for bringing individual continuous primary filaments of said first, second and third sets of continuous primary filaments together lengthwise to form the groupings of continuous primary filaments from the individual continuous primary filaments.

22. The apparatus according to claim 21, wherein: said first filament guide is located intermediate said filament feeder means and said feed rollers.

23. The apparatus according to claim 22, including: a second filament guide intermediate said feed rollers and said attenuation means for guiding the groupings of continuous primary filaments into the high energy attenuation blast.

24. The apparatus according to claim 21, wherein: said attenuation means is a flame attenuation burner.

25. The apparatus according to claim 21, wherein: said first filament guide is located intermediate said feed rollers and said attenuation means.

* * * * *